(12) United States Patent
Berringer et al.

(10) Patent No.: US 6,705,676 B1
(45) Date of Patent: Mar. 16, 2004

(54) BASE FOR INFANT CAR SEAT

(75) Inventors: Ronald B. Berringer, Aurora, OH (US); Phillip Novak, Garfield Heights, OH (US); Mary Ann Celestina-Krevh, Euclid, OH (US); Kirk C. Palmerton, Kent, OH (US)

(73) Assignee: Graco Children's Products Inc., Exton, PA (US)

( * ) Notice: Subject to any disclaimer, the term of this patent is extended or adjusted under 35 U.S.C. 154(b) by 0 days.

(21) Appl. No.: 09/567,099

(22) Filed: May 8, 2000

(51) Int. Cl.[7] .............................................. A47C 1/08
(52) U.S. Cl. ................................ 297/256.16; 297/250.1
(58) Field of Search ....................... 297/250.1, 256.13, 297/256.14, 256.16, 258.1, 259.1, 130, 188.01, 188.08, 188.09, 188.1, 188.12, 188.21

(56) References Cited

U.S. PATENT DOCUMENTS

| | | |
|---|---|---|
| 1,835,848 A | 6/1929 | Cross |
| 3,052,500 A | 9/1962 | Hyde .......................... 297/130 |
| 3,157,432 A | 7/1963 | Watkins ....................... 297/254 |
| 3,357,736 A | 12/1967 | McCarthy .................... 296/65 |
| 4,047,755 A | 9/1977 | McDonald et al. .......... 297/216 |
| 4,231,612 A | 11/1980 | Meeker ....................... 297/250 |
| 4,291,915 A | 9/1981 | Cox |
| 4,376,551 A | 3/1983 | Cone .......................... 297/250 |
| 4,634,175 A | 1/1987 | Wise .......................... 297/183 |
| 4,634,177 A | 1/1987 | Meeker ....................... 297/250 |
| 4,733,909 A | 3/1988 | Single, II et al. ........... 297/250 |
| 4,738,489 A | 4/1988 | Wise et al. .................. 297/487 |
| 4,798,412 A | 1/1989 | Kohus et al. ................ 297/250 |
| 4,854,638 A | 8/1989 | Marcus et al. .............. 297/250 |
| 4,858,997 A * | 8/1989 | Shubin .............. 297/256.13 X |
| 4,936,629 A | 6/1990 | Young ......................... 297/250 |
| 4,971,392 A | 11/1990 | Young ......................... 297/250 |
| 5,031,960 A | 7/1991 | Day ............................ 297/254 |
| 5,052,750 A | 10/1991 | Takahashi et al. .......... 297/250 |
| 5,058,283 A | 10/1991 | Wise et al. .................... 33/371 |
| 5,110,182 A | 5/1992 | Beauvais ..................... 297/216 |
| 5,181,761 A | 1/1993 | Meeker ....................... 297/250 |
| 5,277,472 A | 1/1994 | Freese et al. ................ 297/130 |
| 5,335,964 A | 8/1994 | Sedlack et al. .......... 296/256.13 |
| 5,340,185 A | 8/1994 | Vollmer ...................... 296/68.1 |
| 5,380,062 A | 1/1995 | Nania ...................... 297/256.13 |
| 5,385,387 A | 1/1995 | Kain ....................... 297/256.16 |
| 5,479,892 A * | 1/1996 | Edwards .............. 297/250.1 X |
| 5,551,751 A | 9/1996 | Sedlack et al. ......... 297/256.13 |
| 5,609,393 A * | 3/1997 | Meeker et al. ......... 297/256.13 |
| 5,664,830 A | 9/1997 | Garcia et al. ........... 297/216.11 |
| 5,722,719 A | 3/1998 | Glomstad ................ 297/216.11 |
| 5,746,478 A * | 5/1998 | Lumley et al. ....... 297/250.1 X |
| 5,772,279 A | 6/1998 | Johnson, Jr. ................. 297/130 |
| 5,836,650 A * | 11/1998 | Warner, Jr. et al. ... 297/250.1 X |
| 5,890,762 A * | 4/1999 | Yoshida ............. 297/256.16 X |
| 5,997,086 A | 12/1999 | Gibson et al. ......... 297/256.16 |
| 6,017,088 A * | 1/2000 | Stephens et al. ....... 297/256.16 |
| 6,070,890 A | 6/2000 | Haut et al. ................. 280/47.38 |
| 6,089,663 A * | 7/2000 | Hill .................... 297/188.01 X |
| 6,139,101 A * | 10/2000 | Berringer et al. ... 297/256.16 X |
| 6,170,911 B1 * | 1/2001 | Kassai et al. ............. 297/250.1 |

FOREIGN PATENT DOCUMENTS

| | | |
|---|---|---|
| DE | 200 00 503 | 4/2000 |
| FR | 2 596 338 | 10/1987 |

OTHER PUBLICATIONS

Catalog, Kolcraft® Travel Systems & Kolcraft® Car Seats, pp. 2–5.
Catalog, "Baby Business," Century Products Co., pp. 1–8 (1994).

* cited by examiner

Primary Examiner—Peter R. Brown
Assistant Examiner—Stephen Vu
(74) Attorney, Agent, or Firm—Foley & Lardner

(57) ABSTRACT

A base for an infant car seat includes a tilt adjustment mechanism that provides multiple vertical locking positions for adjusting the attitude of the attached infant car seat relative to a vehicle seat cushion. The base can have a storage compartment for one or more latch assemblies used to latch the base to the vehicle seat anchorages.

18 Claims, 9 Drawing Sheets

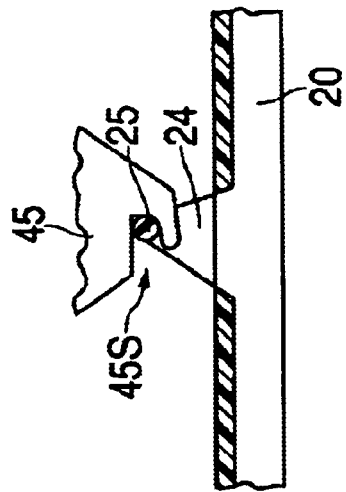
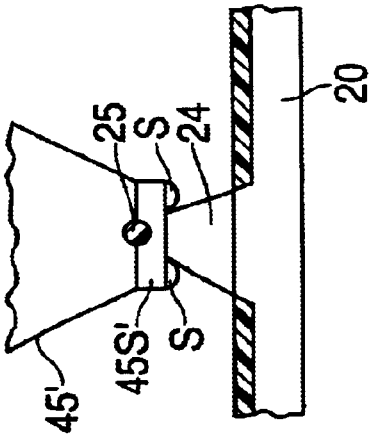
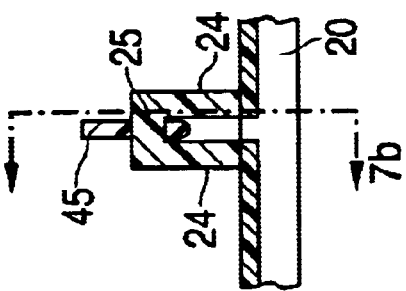
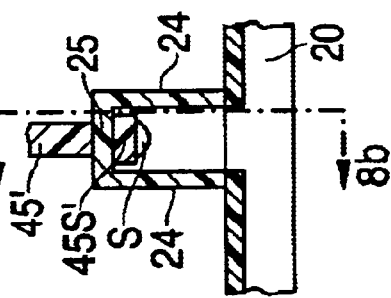

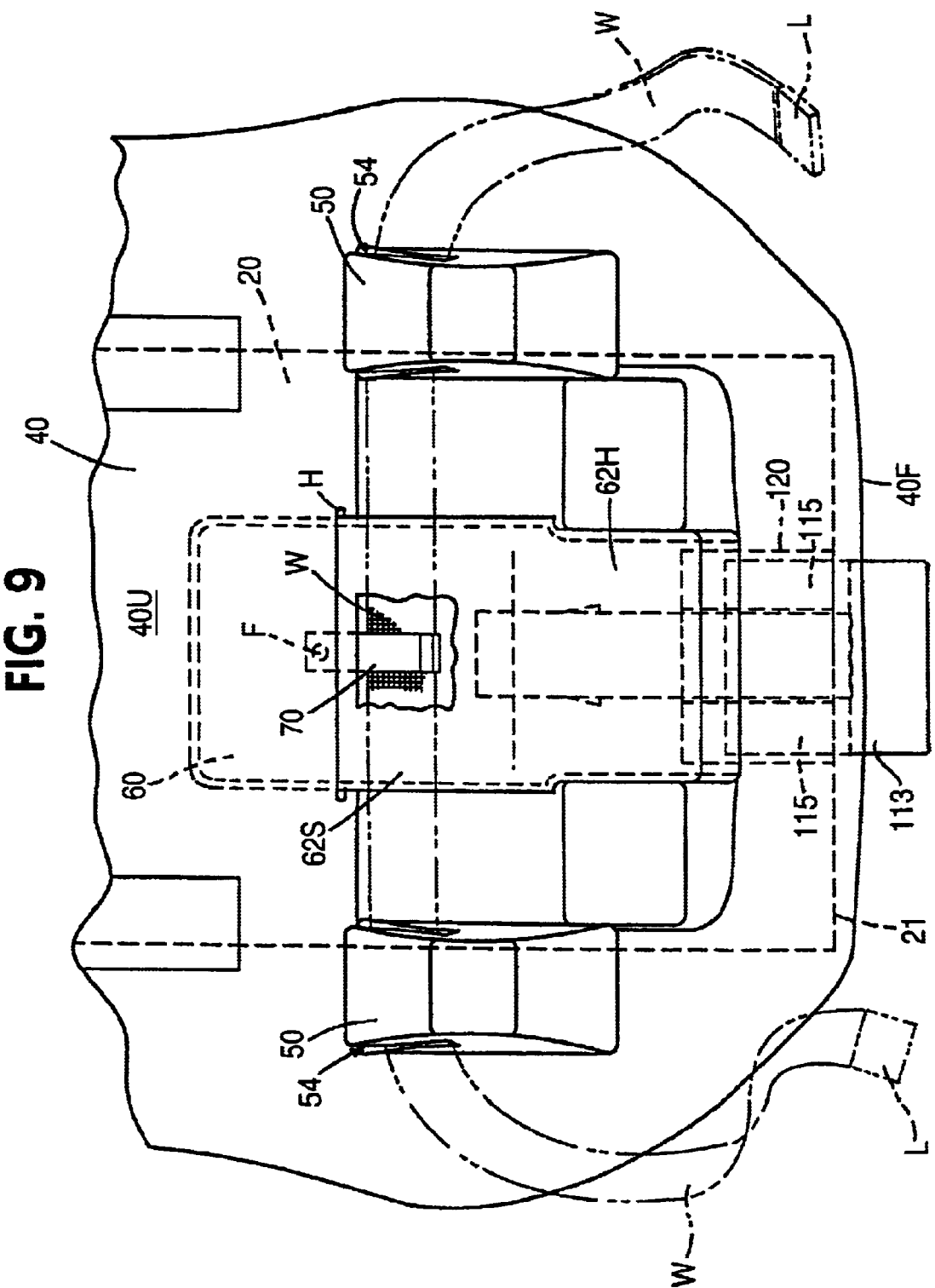

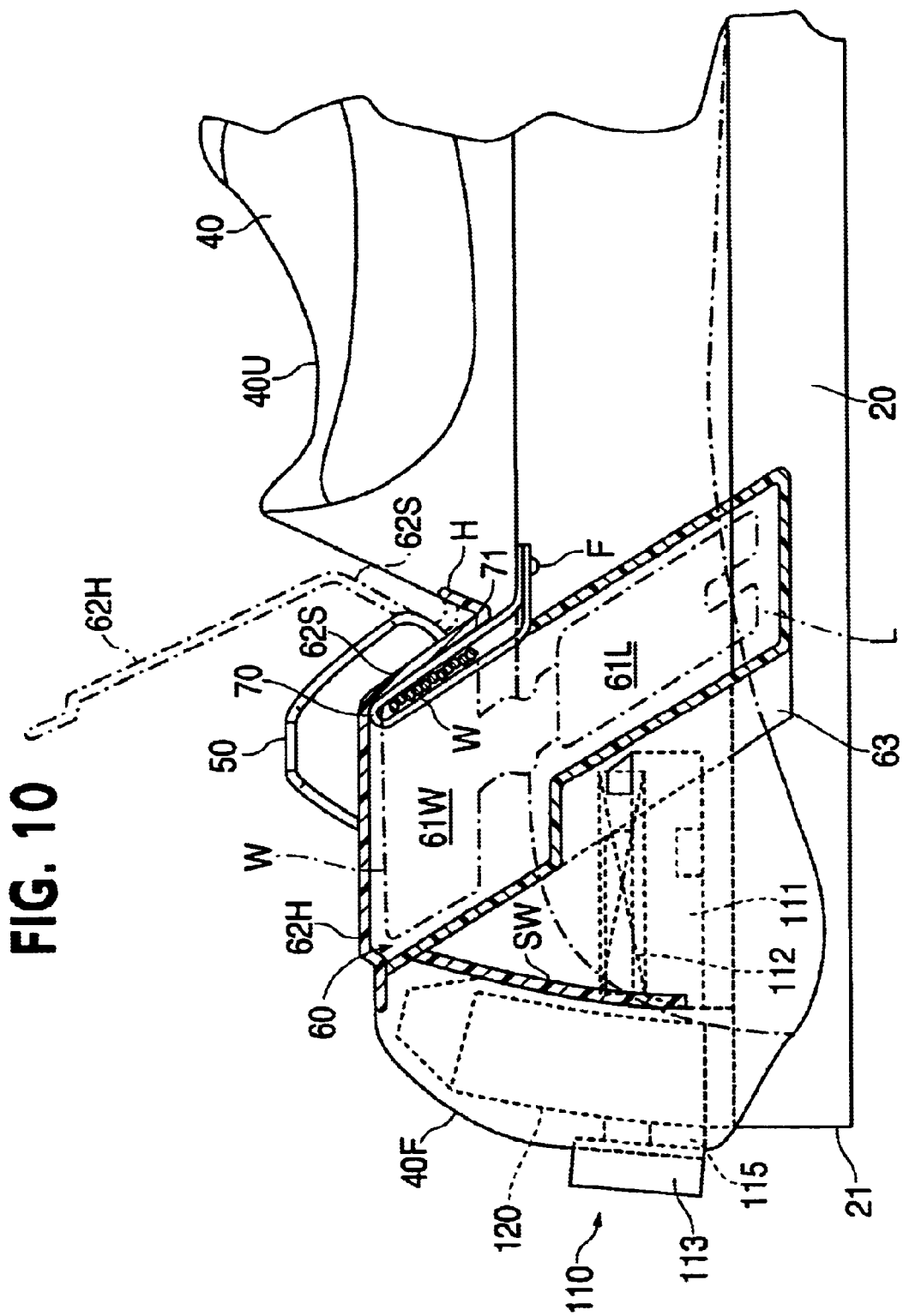

BASE FOR INFANT CAR SEAT

BACKGROUND

Infant car seats are used to safely transport infants in vehicles. Certain infant car seats include a base positioned on the vehicle cushion and an infant car seat removably attached to the base, such as disclosed in U.S. Pat. No. 5,551,751. It is desirable to have the infant car seats properly oriented for optimal safety and comfort.

In the past, the riding attitude of the infant car seat was adjusted by placing a rolled up blanket or some. other maneuverable article underneath the car seat base and manipulating the blanket until the proper attitude was achieved. This practice, however, can be inconvenient and awkward. More recently, child car seats have been designed with tilt adjustment mechanisms to adjust the car seat position relative to the vehicle seat cushion. See, for instance, the car seat described in U.S. Pat. 5,836,650. The adjustment mechanism for such a car seat can include a support member, or support foot, at a front portion of the car seat base. The relative positioning of the support member and the car seat base can be changed to tilt the car seat base relative to the vehicle seat cushion. The front end of the car seat base is raised relative to the support member, and the car seat base pivots, or rocks back, along its rear end. This type of adjustment mechanism can leave a gap between the underside of the car seat base and the vehicle seat cushion. Gapping is undesirable, as the gap provides an area where trash, such as cans, bottles, magazines, etc, can collect.

U.S. patent application Ser. No. 09/421,411, the disclosure of which is incorporated herein by reference, provides an infant car seat/carrier assembly that eliminates the gap and provides a bigger support surface area on the vehicle seat cushion. The assembly of Ser. No. 09/421,411 includes a base and a foot that extends beneath the base from its front end toward its back end. The foot both tilts the base relative to the vehicle seat cushion and provides a relatively large flat surface for resting the base on the vehicle seat cushion. Although the foot performs well to achieve the proper attitude of the base on the vehicle seat, the multiple components of the foot make it less than ideal from a manufacturing standpoint. It would be desirable to further improve the configuration of infant car seat bases to achieve one that is simple in construction and that includes a large, lower surface area for placement on the vehicle seat cushion.

Other considerations applicable to infant car seat bases include recent regulations promulgated in the United States that will require vehicle manufacturers to place anchorages in their vehicles so that the infant car seats can be more securely coupled to the vehicles. By Sep. 1, 2002, infant car seat manufacturers will be required to add additional anchor straps to the lower part of their products. The anchor straps will be used to attach the infant car seat to a pair of anchorages located in the vehicle's rear seats at the crease where the seat back and seat cushion come together. These anchorages will consist of round metal bars spaced 280 mm, center-to-center. Latches will be used to connect the anchor straps to the lower anchorages. The anchor straps and associated latches will add some bulk and extra components to the infant car seats. In anticipation of the new regulations, it would be desirable for infant, toddler, and child car seats to include a way to store the anchor straps and latches.

The present invention addresses these needs to further improve car seats and car seat bases.

SUMMARY OF THE INVENTION

The present invention is drawn to a base for an infant car seat. In one aspect of the invention, the base has a tilt adjustment mechanism that allows multiple vertical locking positions for adjusting the attitude of the attached infant car seat relative to a vehicle seat cushion. In another aspect, the base can have a storage compartment for one or more anchor strap and latch assemblies used to latch the base to anchorages in the vehicle seat.

A base for a child seat in accordance with one aspect of the invention comprises an upper surface adapted to carry an infant car seat and a storage compartment formed in the base. The storage compartment opens to an exterior surface of the base, preferably to the base's upper surface. The base further includes a cover for the storage compartment. The cover is movably attached to the upper surface by, for example, a hinge, and moves between an open position and a closed position. The storage compartment preferably is located between belt guides formed on the upper surface of the base. The storage compartment is preferably sized to store a pair of latches and associated webbing or anchor straps. The storage compartment preferably is defined by at least one side wall, which has at least one attachment element. The attachment element can comprise a looped retainer secured to an underside of the base.

In accordance with another aspect of the invention, a base for an infant car seat comprises an upper base unit, a sub-base unit, a height adjustment mechanism, and a pivot mechanism. The upper base unit is adapted to carry an infant car seat. The sub-base unit is adapted to rest on a vehicle seat cushion and has a length at least half of a length of the upper base unit. The upper base unit is tiltably mounted to the sub-base unit to permit vertical adjustment of the upper base unit at a plurality of vertical tilt positions relative to the sub-base unit. The height adjustment mechanism includes a single, curved height adjustment rack and an actuator that releasably engages the height adjustment rack at different vertical locations along the height adjustment rack. The height adjustment rack is located on an upper surface of the sub-base unit adjacent a first end thereof. The actuator is mounted to the upper base unit such that movement of the actuator from one of the vertical locations to another of the vertical locations tilts the upper base unit from one of the vertical tilt positions to another of the vertical tilt positions. The pivot mechanism pivotally connects the upper base unit to the sub-base unit. The pivot mechanism has a first part on the sub-base unit and a second part on the upper base unit. The first part is located at a position closer to a second end of the sub-base unit than to the first end of the sub-base unit.

These features, as well as other features, of the present invention will be set forth in the description that follows.

BRIEF DESCRIPTION OF THE DRAWINGS

These and other features, aspects, and advantages of the present invention will become apparent from the following detailed description, appended claims, and the accompanying exemplary embodiment shown in the drawings, which are briefly described below.

FIG. 3A is a perspective view of a pivot structure.

FIG. 7a is a front view of a pivotal attachment of the upper base unit to the sub-base unit.

FIG. 7b is a side view of the pivotal attachment of FIG. 7a taken along line 7b–7b.

FIG. 8a is a front view of an alternative pivotal attachment of the upper base unit to the sub-base unit.

FIG. 8b is a side view of the pivotal attachment of FIG. 8a taken along line 7b–7b.

FIG. 9 is an enlarged, top plan view of the front portion of the car seat base.

FIG. 10 is an enlarged, side elevation view, in partial cross section, of a front portion of the car seat base.

DETAILED DESCRIPTION

Sometimes references are made to directions in describing the drawings or description of the car seat base 10 of the present invention. The directions, such as left, right, upper, lower, etc., are made relative to the drawings (as normally viewed) for convenience. These directions are not intended to be taken literally or limit the present invention in any form.

Figure 1:
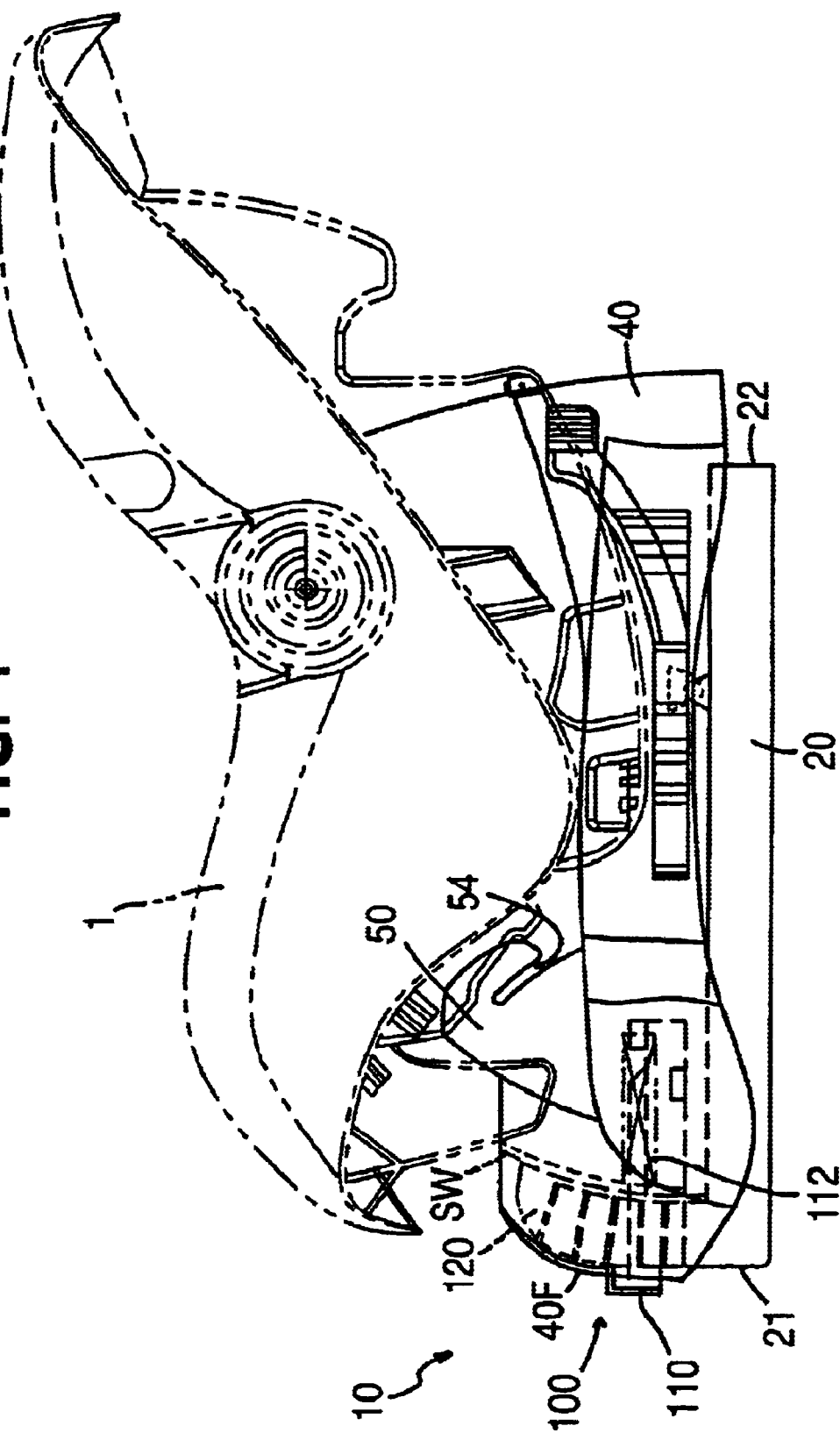
FIG. 1 is a side elevation view of a car seat base in a lowest position according to the invention.

Referring now to the drawings, wherein identical numerals indicate like parts, and initially to FIG. 1, there will be seen a car seat base 10 according to the invention. The infant car seat base 10 is adapted to releasably mount or carry an infant car seat 1 (illustrated in phantom), also known as an infant carrier. Infant car seats are positioned to face rearwardly relative to the vehicle seat. The infant car seat itself and the particular manner of attaching the infant car seat to the base do not form part of the present invention. The base 10 has a contoured upper surface 40U to which the infant car seat 1 can be releasably latched. The base 10 is adapted to attach to the vehicle seat cushion using shoulder and/or lap belts (not shown), which attach to belt buckles of the vehicle seat (not shown), or using anchor straps/webbing W, which attach to anchorages (not shown) positioned at the crease where the vehicle seat back and the vehicle seat cushion come together. The infant car seat 1 can be removed and carried without the base 10.

To promote correct installation of the base 10 to a vehicle seat cushion, which can vary among different cars, the base 10 or the infant car seat 1 itself can include a level indicator (not shown), such as a level indicator described in U.S. Pat. No. 5,058,283, issued to Wise et al., the disclosure of which is incorporated herein by reference. The level indicator works with a height/tilt adjuster (described below), which can adjust the tilt of the base relative to the vehicle seat cushion. The level indicator can have a colored segment or pointer that indicates whether the infant car seat 1, when mounted to the base 10 on the vehicle seat cushion, is correctly angled.

Figure 2:
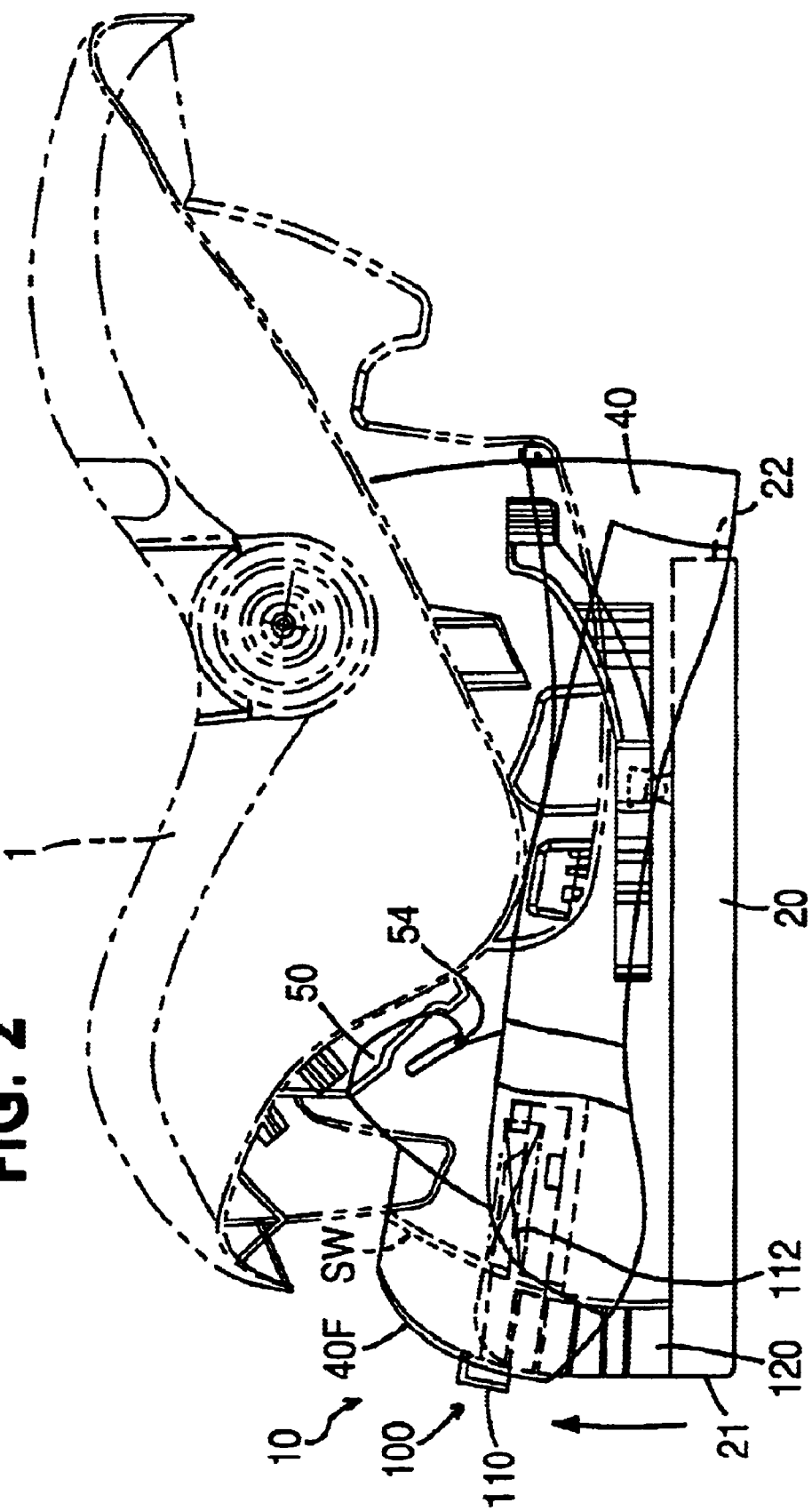
FIG. 2 is a side elevation view of the car seat base in a highest position.
Figure 3:
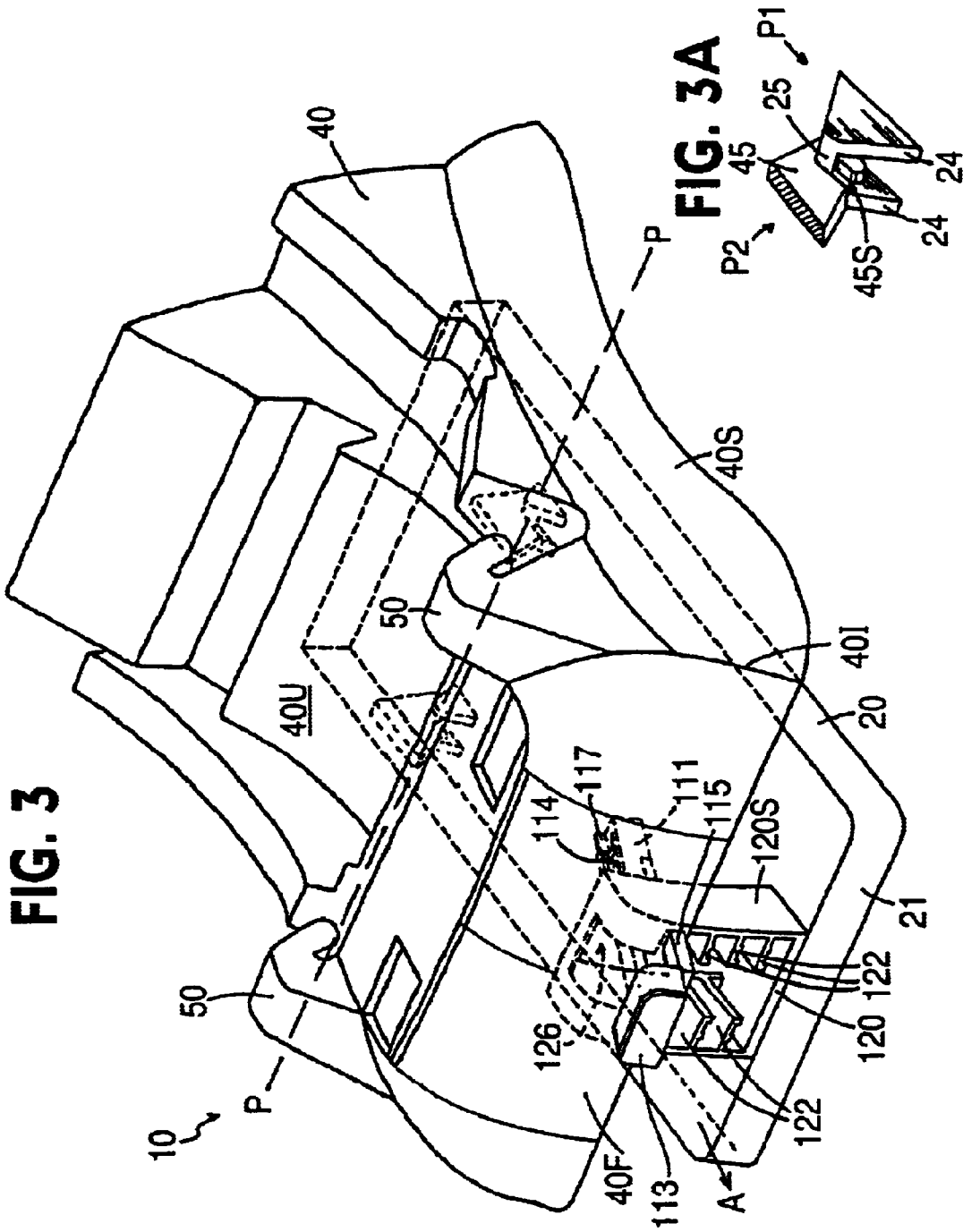
FIG. 3 is a perspective view of the car seat base.

Referring to FIGS. 1–3, the base 10 comprises a sub-base unit 20 and an upper base unit 40 pivotally mounted to the sub-base unit 20 about a pivot axis P. The upper base unit 40 is adapted to carry the infant car seat 1 on its contoured upper surface 40U. The sub-base unit 20 is adapted to rest on a vehicle seat cushion. The sub-base unit 20 has a length at least half the length of the upper base unit 40, thereby creating a relatively large footprint against the vehicle seat cushion. The bottom surface of the sub-base unit 20, which contacts the vehicle seat cushion, can include friction enhancing means, such as textures, channels, ridges, etc. The upper base unit 40 preferably is made of a thermoplastic or thermosetting plastic material. The sub-base unit 20 preferably is fabricated from molded plastic materials.

The upper base unit 40 is pivotally mounted to the sub-base unit 20 to permit vertical adjustment of the upper base unit 40 at a plurality of vertical tilt positions relative to the sub-base unit 20. To accomplish this, the base 10 further includes a tilt or height adjuster 100 that maintains the upper base unit 40 at a desired tilted angle relative to the sub-base unit 20. FIG. 1 shows the upper base unit 40 in a low position, and FIG. 2 shows the upper base unit 40 in a high tilt position. Referring to FIG. 3, the sub-base unit 20 comprises a substantially planar member, such as a rectangular plate, configured so that the upper base unit 40 can straddle it, while enabling the upper base unit 40 to rock or pivot about a pivot axis P, which extends substantially perpendicular to the longitudinal axis of the sub-base unit 20.

The upper base unit 40 includes at least one, and preferably two, belt (or strap) guides 50 and can include a storage compartment 60, which will be described in detail below. The upper base unit 40 includes a means for detachably mounting the infant car seat 1 to the upper base unit 40. The detachably mounting means can be any known mounting mechanism, such as the ones disclosed in U.S. Pat. Nos. 5,772,279 and 5,385,387, or, alternatively, as disclosed in co-pending U.S. patent application Ser. No. 08/927,019 (now U.S. Pat. No. 6,070,890) or Ser. No. 09/421,411.

Along the pivot axis P, a first pivot member P1 preferably is formed on the sub-base unit 20 and a second complementary pivot member P2 is formed on the upper base unit 40. The second pivot member P2 is located at a position closer to a second end 22 of the sub-base unit 20 than a first end 21 thereof. Referring to FIGS. 3, 3A, 7A, and 7B, one or more first pivot members P1 can be located along the pivot axis P on the sub-base unit 20. The first pivot members P1 each can comprise a pair of laterally spaced triangular walls 24 extending up from the top surface of the sub-base unit 20 and having a pivot shaft 25 extending therebetween. The pivot shafts 25 of the pivot members P1 are aligned along the pivot axis P. The second pivot members P2, in turn, each can comprise a hook or hook-like member 45 extending down from an underside of the upper base unit 40, where the hooks or hook-like members 45 are positioned to be inserted between the walls 24 and to pivot around the pivot shafts 25 of the first pivot members P1. The pivot shafts 25 can be integrally formed with or otherwise connected to the associated walls 24. Each hook or hook-like member 45 can be formed from a leg or rib-like structure depending downwardly from the underside the upper base unit 40, with a slot 45S dimensioned to receive the associated pivot shaft 25.

Alternatively, referring to FIGS. 8A and 8B, instead of the hook 45, each second pivot member P2 can be formed from two part members, a rib 45' with a first recess R1 dimensioned to receive an upper portion of the shaft 25 and a securing member 45S' with a second recess R2 diametrically opposite the first recess R1 and dimensioned to receive the remaining lower portion of the shaft 25. The securing member 45S' is secured to the rib 45' with one or more screws or the like S.

In yet another arrangement, the pivot axis P can include pivot structures configured as disclosed in co-pending U.S. patent application Ser. No. 09/421,411, the disclosure of which is incorporated herein by reference. In particular, the sub-base unit 20 can include a plurality of upwardly extending projections, and the upper base unit 40 can include complementary sockets that receive the projections. The projections and the sockets are mutually dimensioned to enable the upper base unit 40 to pivot about the sub-base unit 20.

The tilt adjuster 100 is designed to tilt the car seat base 10 relative to the vehicle seat cushion. In this respect, any known tilt or height adjuster can be used for this purpose. For example, U.S. Pat. No. 5,836,650, issued to Warner, Jr. et al. discloses a height adjustment mechanism for a car seat. This type of mechanism can be adapted to tilt the base 10.

Figure 4:
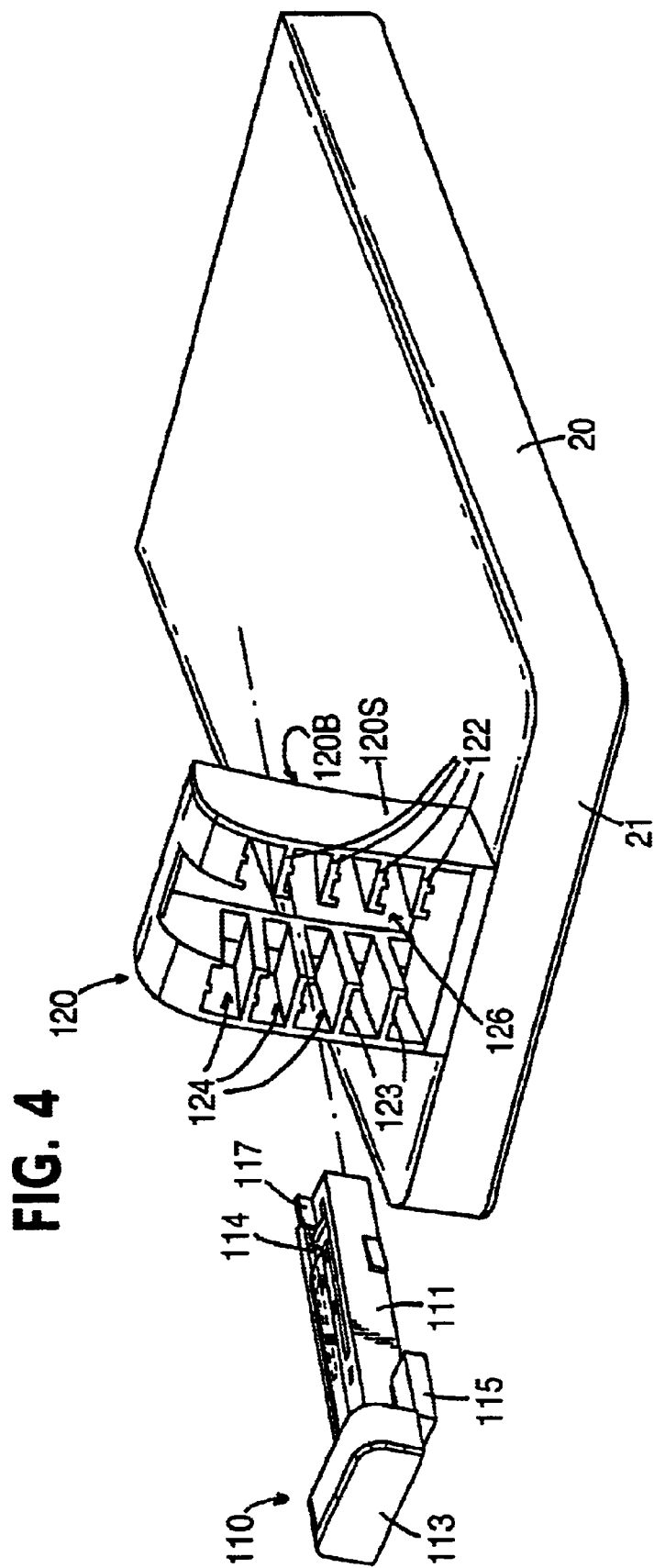
FIG. 4 is a perspective view of an actuator and a sub-base unit of the car seat base.

Referring to FIGS. 3 and 4, the preferred tilt adjuster 100 according to the present invention comprises an actuator 110 carried by the upper base unit 40 and a height adjustment rack 120, which can be fixedly connected to or integrally formed with the sub-base unit 20 adjacent the first end 21 thereof. The adjustment rack 120 extends substantially vertically and is curved to substantially follow the radius R of the pivot axis P, i.e., the distance from the pivot axis P to the back wall 120B of the rack 120. The adjustment rack 120 includes a plurality of rows of opposing support shelves 122 supported by the back wall 120B and side walls 120S. The shelves 122 are vertically spaced to define a plurality of vertical slots or locations 124 at which the actuator 110 can rest or be confined. Movement of the actuator 110 from one of the vertical locations 124 to another of the vertical locations 124 tilts the upper base unit 40 from one vertical tilt position to another vertical tilt position.

Referring to FIG. 4, the actuator 110 has a stem portion 111, which is a substantially elongated member, a handle 113 at a proximal end of the stem 111, and a pair of laterally projecting teeth 115, one on each side of the stem 111. The front ends of the teeth 115 terminate with the front end of the stem 111. When the actuator 110 is positioned in an engaged position within the adjustment rack 120, the teeth 115 are stationed in a vertical slot 124 between two pairs of adjacent shelves 122 to maintain the upper base unit 40 in a fixed position relative to the sub-base unit 20. The teeth 115 are configured to engage opposing shelves 122 to prevent the upper base unit 40 from moving relative to the sub-base unit 20, whereas a central area spacing 126 between the rows of support shelves 122 is sufficient to clear the stem 111 of the actuator 110 so that the actuator 110, and consequently the upper base unit 40, can move up and down relative to the sub-base unit 20. In this respect, when the actuator 110 is pulled to the release position, in the direction of arrow A in FIG. 3, the stem 111 can slide up and down freely in the central area spacing 126, between the two rows of shelves 122.

The vertical spacing between shelves 122 is dimensioned to allow the teeth 115 to slide in and out. In the engaged or locked position, the upper surfaces of the teeth 115 bear against the lower surfaces of the respective pair of shelves, as shown in FIG. 3, and the lower surfaces of the teeth 115 can bear against the upper surfaces of the next-lower pair of the shelves 122. The lower surface of each shelf 122 can include ribs 123 to enhance engagement of the upper surfaces of the teeth 115 against the lower surfaces of the shelves 122.

A spring 112 normally biases the actuator 110 into the engaged position. The spring 112 is mounted to the stem 111, which includes a generally H-shaped aperture 114 to accommodate and retain the spring 112. The proximal end of the spring 112, which faces the handle 113 of the actuator 110, bears against a spring wall member SW extending substantially downwardly from the underside of the upper base unit 40. This wall member SW has an opening dimensioned to accommodate the stem 111 and through which the stem 111 of the actuator 110 can slide. The opening's upper and lower edges can abut against the stem 111 so that the stem 111 moves together with the wall member SW. In this respect, the wall member SW is slidably situated against the back wall 120B of the adjustment rack 120, as shown in FIG. 10. The spring 112 is situated between the wall member SW and the distal end portion of the stem 111, which portion has a spring alignment tab 117 to align the spring 112 in position in the H-shaped aperture of the stem 111.

The front wall 40F of the upper base unit 40 has an opening configured to allow the stem 111 with the teeth 115 to pass, but to prevent the handle 113 from being inserted into the front wall 40F. That is, the handle 113 acts as a stop, abutting against the front wall 40F. Alternatively, the opening can be sufficiently large so that the handle 113 can abut against the front side of the adjustment rack 120, when the actuator 110 is in the released position. The front wall 40F of the upper base unit 40 follows the vertical movement of the actuator 110 along the adjustment rack 120 due to the engagement of the actuator 110 with front wall 40F and spring wall member SW.

To change the tilt of the upper base unit 40, the user pulls the actuator 110 outwardly away from the adjustment rack 120, until the teeth 115 clear the adjustment rack 120. The released position of the actuator 110 is shown in FIG. 3. As the user pulls the actuator 110 from the adjustment rack 120, the spring 112 becomes compressed. With the actuator 110 sufficiently pulled to withdraw the teeth 115 out of the shelves, the actuator 110 can be maneuvered substantially vertically in either the upward or downward direction along the spacing 126 to change the vertical position of the upper base unit 40 relative to the sub-base unit 20. When the correct vertical position is achieved, the user releases the actuator 110, and the spring 112 forces the actuator 110 to move rearwardly into the adjustment rack 120 so that the teeth 115 on either side of the stem 111 slide in between the appropriate shelves 122. In this manner, the relative positional attitude of the upper base unit 40 relative to the sub-base unit 20 can be adjusted.

In another aspect of the invention, the car seat base 10 includes a storage compartment 60 that is accessible from an exterior of the base 10. Referring to FIGS. 9 and 10, the storage compartment 60 is positioned behind the tilt adjuster 100. The compartment 60 extends downwardly at an angle from the front upper side of the upper base unit 40 and is positioned between the belt guides 50, which each define a slot 54 for receiving a belt and forming a belt pathway. The storage compartment 60 is configured to clear the distal end of the actuator 110, as illustrated in FIG. 10. In addition, in a preferred embodiment as shown in FIG. 10, the compartment 60 is configured to straddle over the actuator 110 to maximize the storage space. FIG. 10 shows a side wall 63 of the storage compartment 60. In this respect, the compartment 60 can have an angled, inverted U-shape.

The compartment 60 opens to the upper surface 40U of the upper base unit 40. The compartment 60 includes a cover or lid 62, which can be pivotally mounted by, for example, a hinge H, to the upper base unit 40, as shown in FIG. 10. In this respect, the cover 62 has a substantially horizontal portion 62H followed by a sloped portion 62S, the latter being substantially parallel to the slots 54 or configured to guide the belt to the slots 54.

When a vehicle lap belt is used to secure the car seat base 10 to the vehicle, the belt is passed through the slots 54 formed in the hook shaped members 50 and over the compartment cover 62, substantially parallel to the sloped portion 62S, and then is connected to the vehicle seat belt buckle. When the lap belt is tightened to remove slack, the lap belt secures the car seat base 10 to the vehicle seat cushion.

Should an anchor latch assembly be used to secure the car seat base 10 to the vehicle, the storage compartment 60 provides a storage spaced for the anchor straps/webbing and any associated latches, such as the ones disclosed in co-pending U.S. patent application Ser. No. 09/564,952. Such an anchor latch assembly can include an anchor strap(s) or webbing with latches attached to the ends of the straps. The storage compartment 60 is configured to contain the anchor straps/webbing W and latches L, as shown in FIG. 10. In one embodiment, for example, the storage compartment 60 can include a first compartment area 61W sized to store webbing W and a second compartment area 61L, continuous with the first compartment area 61W, and sized to store the latches L. The storage compartment 60, of course, can be used to store any other attachment means for securing the base 10 to the vehicle seat or any child-related items.

In the area of the storage compartment, the car seat base 10 can include a webbing retainer 70 mounted to an underside of the upper base unit 40 to hold the webbing W. FIGS. 9 and 10 show webbing W passing through the webbing retainer 70. The webbing retainer 70 comprises a loop or ring like member positioned between the hook shaped members 50 and connected to the underside of the upper base unit 40, such as with a conventional fastener F. The webbing retainer 70 lies substantially in the pathway of the belt or closely adjacent thereto, as shown in FIG. 10. When the compartment cover 62 is closed, the upper, angled side 71 of the webbing retainer 70 is covered by the cover 62 so that the webbing retainer 70 does not interfere with attachment of the car seat base 10 to a vehicle seat via a lap or shoulder belt.

To use the anchor latch assembly to secure the car seat base 10 to a vehicle seat cushion, the compartment cover 62 is opened, and the webbing W and latches L are withdrawn from the storage compartment 60. The webbing W on both sides of the retainer 70 is fed through the respective slots 54 in belt guides 50, the webbing W extending laterally from the webbing retainer 70. Once the webbing W is in place through the slots 54, the cover 62 is closed. The cover 62 has slots (not shown) through which the webbing W can pass while the cover 62 is in the closed position. The latches L can then be secured to the anchorages located in the crease between the vehicle seat back and the vehicle seat cushion. The webbing W is then tightened to secure the car seat base 10 in place. The webbing retainer 70 can be configured to allow the webbing W to slide if only one end of the webbing W is adjustable, or, alternatively, can be configured to fix the webbing W thereto if both ends of the webbing W are adjustable.

Figure 5:
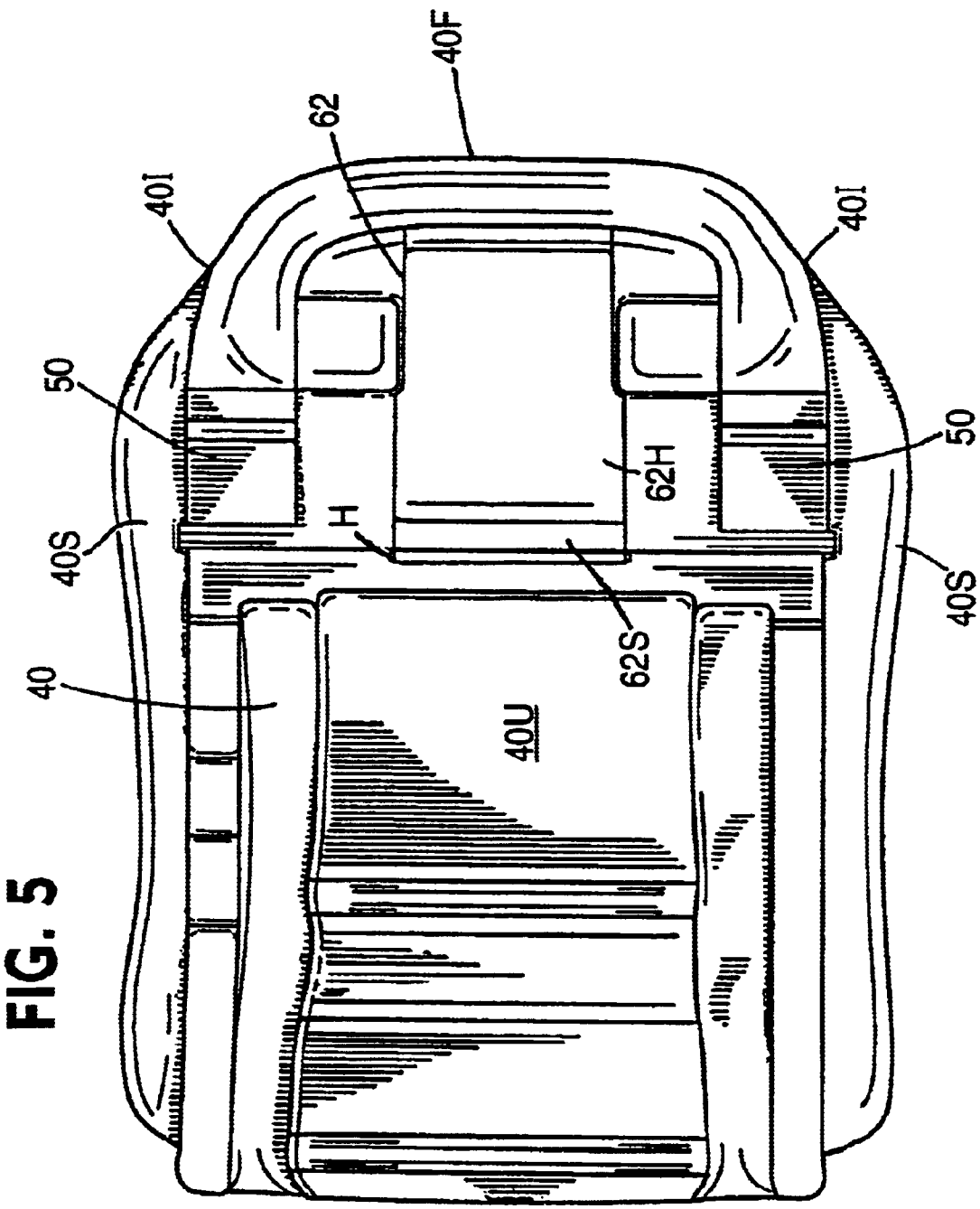
FIG. 5 is a top plan view of the upper base unit of the car seat base.
Figure 6:
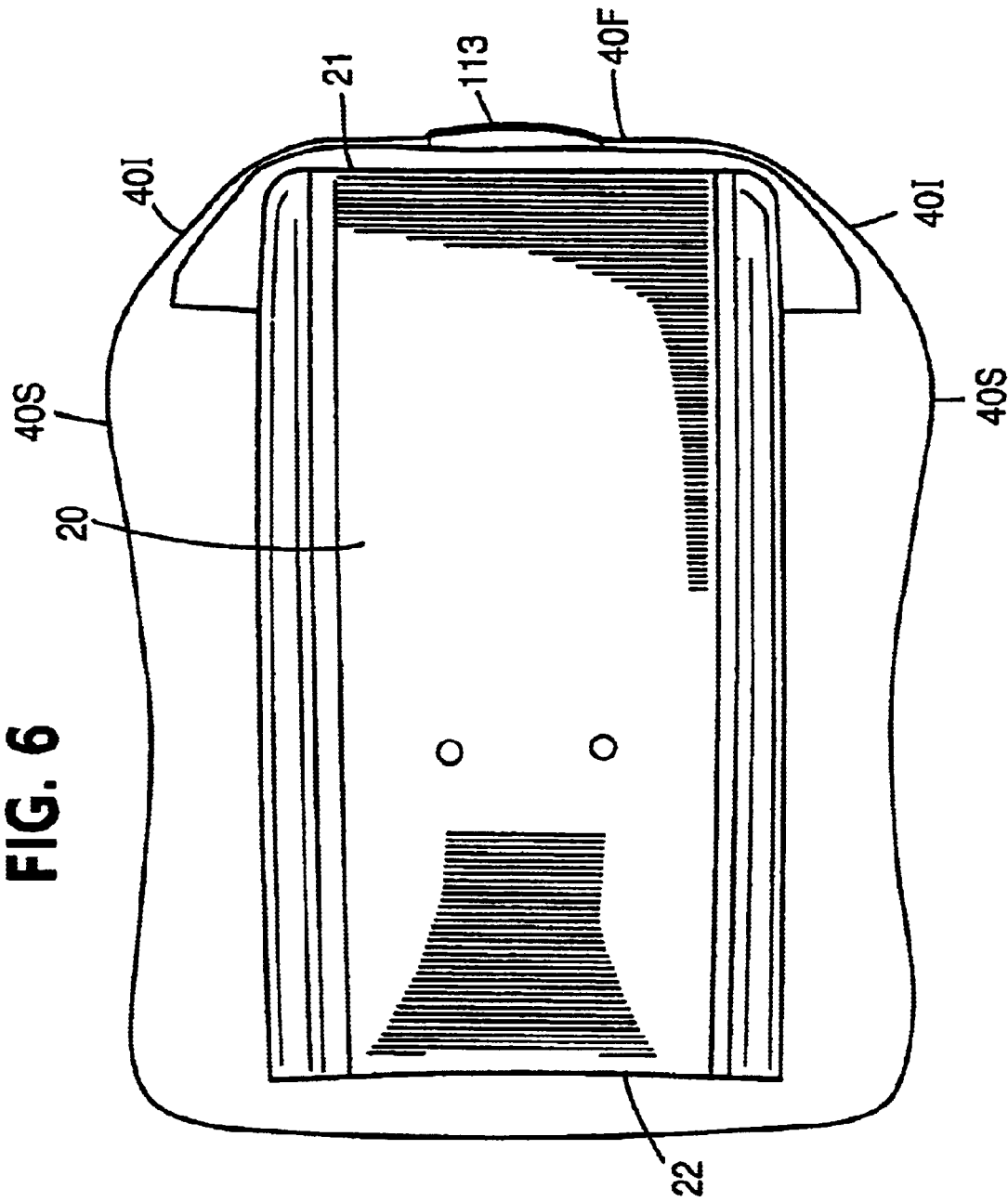
FIG. 6 is a bottom plan view of the car seat base.

The upper base 40 is contoured and has a generally convex front surface 40F and generally convex side surfaces 40S. At areas of intersection of the front surface 40F with the side surfaces 40S, the upper base 40 defines a generally flat or slightly concave surface 401, as shown in FIG. 5, over which the webbing W can pass. The webbing W thus can fit snugly against the upper base 40 to secure the car seat base 10 to the vehicle seat cushion.

Although FIGS. 9 and 10 show the storage compartment 60 opening to the upper surface 40U of the upper base unit 40, it will be understood that the storage compartment 60 can be configured to open to any exterior surface of the upper base unit 40, including the front surface 40F or the side surfaces 40S. Further, the base 10 can include more than one storage compartment 60, for example, two storage compartments, one opening to each side surface 40S.

Given the disclosure of the present invention, one versed in the art will appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

What is claimed is:

1. A base for an infant car seat, comprising:
    an upper surface adapted to carry an infant car seat;
    an anchor latch assembly including a pair of anchor latches and webbing therebetween to connect the anchor latches;
    a storage compartment formed in the base, the storage compartment accessible from an exterior of the base and sized to store the anchor latches and the webbing; and
    a webbing retainer through which the webbing can pass, the webbing retainer being mounted to the base to extend within the storage compartment such that the anchor latches and the webbing can be stored in the storage compartment,
    wherein the anchor latches are permanently connected to the webbing retainer.

2. The base according to claim 1, wherein the storage compartment opens to the upper surface of the base.

3. The base according to claim 1, wherein the storage compartment is located along a longitudinal axis bisecting the base.

4. The base for an infant car seat according to claim 1, wherein the webbing retainer is a looped retainer.

5. A base for an infant car seat, comprising:
    an upper surface adapted to carry an infant car seat;
    an anchor latch assembly including a pair of anchor latches and webbing therebetween to connect the anchor latches, the anchor latch assembly being storable in the base;
    a storage compartment formed in the base, the storage compartment accessible from an exterior of the base and sized to store the anchor latches and the webbing;
    a webbing retainer through which the webbing can pass, the webbing retainer being mounted to the base to extend within the storage compartment such that the anchor latches and the webbing can be stored in the storage compartment; and
    a cover for the storage compartment, the cover being movably attached to the upper surface of the base and movable between an open position and a closed position,
    wherein the storage compartment opens to the upper surface of the base.

6. The base according to claim 5, wherein the cover is hinged to the upper surface.

7. A base for an infant car seat, comprising:
    an upper surface adapted to carry an infant car seat;
    an anchor latch assembly including a pair of anchor latches and webbing;
    a storage compartment formed in the base, the storage compartment accessible from an exterior of the base and sized to store the anchor latches and the webbing;
    a webbing retainer through which the webbing can pass, the webbing retainer being mounted to the base to extend within the storage compartment such that the anchor latches and the webbing can be stored in the storage compartment; and a pair of belt guides formed on the upper surface, the storage compartment being located between the pair of belt guides.

8. A base for an infant car seat, comprising:

an upper surface adapted to carry an infant car seat; and a storage compartment formed in the base, the storage compartment accessible from an exterior of the base; and a generally convex front surface depending downwardly from the upper surface and generally convex side surfaces depending downwardly from the upper surface, wherein an area of intersection of the front surface with each of the side surfaces defines a generally concave surface for passage of a webbing.

9. A base for an infant car seat, comprising:

an upper surface adapted to carry an infant car seat;

an anchor latch assembly including a pair of anchor latches and webbing;

a storage compartment formed in the base, the storage compartment accessible from an exterior of the base and sized to store the anchor latches and the webbing; and a webbing retainer through which the webbing can pass, the webbing retainer being mounted to the base to extend within the storage compartment such that the anchor latches and the webbing can be stored in the storage compartment, wherein the storage compartment includes a first compartment sized to store the webbing and a second compartment being continuous with the first compartment and sized to store the anchor latches.

10. A base for an infant car seat, comprising:

an upper surface adapted to carry an infant car seat;

an anchor latch assembly including a pair of anchor latches and webbing;

a storage compartment formed in the base, the storage compartment accessible from an exterior of the base and sized to store the anchor latches and the webbing;

a webbing retainer through which the webbing can pass, the webbing retainer being mounted to the base to extend within the storage compartment such that the anchor latches and the webbing can be stored in the storage compartment;

an upper base unit that includes the upper surface; and a sub-base unit adapted to rest on a vehicle seat cushion, the upper base unit being tiltably mounted to the sub-base unit to permit vertical adjustment of the upper base unit at a plurality of vertical tilt positions relative to the sub-base unit, and the storage compartment being formed in the upper base unit.

11. A base for an infant car seat, comprising:

an upper base unit adapted to carry an infant car seat;

a sub-base unit adapted to rest on a vehicle seat cushion and having a length at least half of a length of the upper base unit, the upper base unit being tiltably mounted to the sub-base unit about a pivot axis to permit vertical adjustment of the upper base unit at a plurality of vertical tilt positions relative to the sub-base unit;

a height adjustment mechanism including a height adjustment rack and an actuator that releasably engages the height adjustment rack at different vertical locations along the height adjustment rack, the height adjustment rack being located on an upper surface of the sub-base unit adjacent a first end thereof, and the actuator being mounted to the upper base unit such that movement of the actuator from one of the vertical locations to another of the vertical locations tilts the upper base unit from one of the vertical tilt positions to another of the vertical tilt positions, the height adjustment rack having a back wall that curves to substantially follow a radius of the pivot axis, where the radius extends from the pivot axis to the back wall; and a pivot mechanism pivotally connecting the upper base unit to the sub-base unit, the pivot mechanism having a first part on the sub-base unit and a second part on the upper base unit, the first part being located at a position closer to a second end of the sub-base unit than to the first end of the sub-base unit.

12. The base according to claim 11, wherein the height adjustment rack has a plurality of shelf segments, the shelf segments defining slots therebetween for receipt of the actuator.

13. The base according to claim 12, wherein a lower surface of each shelf segment includes ribs.

14. The base according to claim 12, wherein the actuator includes teeth that fit into opposed slots defined by the shelves.

15. The base according to claim 12, wherein the actuator includes a stem portion having a first end and a second end, a handle on the first end of the actuator, and a pair of teeth mounted to the stem portion behind the handle for engagement in respective slots of the height adjustment rack.

16. The base according to claim 12, wherein the height adjustment mechanism further includes a bias member that biases the actuator into engagement with the height adjustment rack.

17. A base for an infant car seat, comprising:

an upper base unit adapted to carry an infant car seat;

a sub-base unit adapted to rest on a vehicle seat cushion, the upper base unit being tiltably mounted to the sub-base unit to permit vertical adjustment of the upper base unit at a plurality of vertical tilt positions relative to the sub-base unit;

a height adjustment mechanism, located on an upper surface of the sub-base unit adjacent a first end thereof, to tilt the upper base unit from one of the vertical tilt positions to another of the vertical tilt positions;

a pivot mechanism pivotally connecting the upper base unit to the sub-base unit, and a storage compartment formed within the upper base unit between the height adjustment mechanism and the pivot mechanism.

18. A base for an infant car seat, comprising:

an upper surface adapted to carry an infant car seat;

an anchor latch assembly including a pair of anchor latches and webbing therebetween to connect the anchor latches, the anchor latch assembly being storable in the base;

a storage compartment formed in the base, the storage compartment accessible from an exterior of the base and sized to store the anchor latches and the webbing; and a webbing retainer through which the webbing can pass, the webbing retainer being mounted to the base to extend within the storage compartment such that the anchor latches and the webbing can be stored in the storage compartment.

* * * * *